April 8, 1930.  H. E. NORVIEL  1,753,576
SWITCHING APPARATUS FOR STEERING COLUMN CONTROLS
Filed April 28, 1925
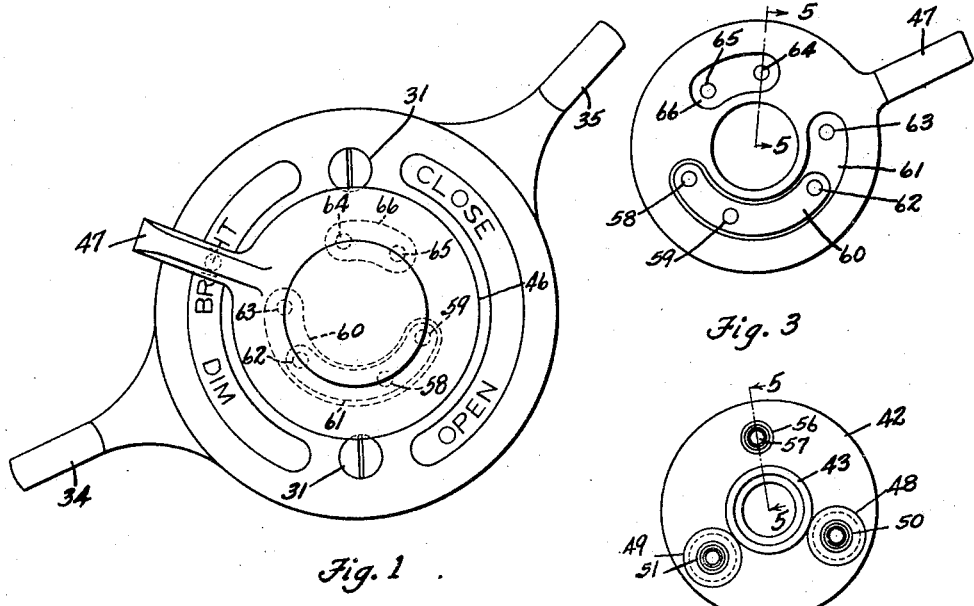
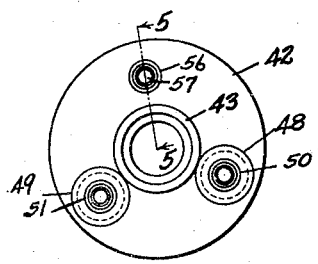
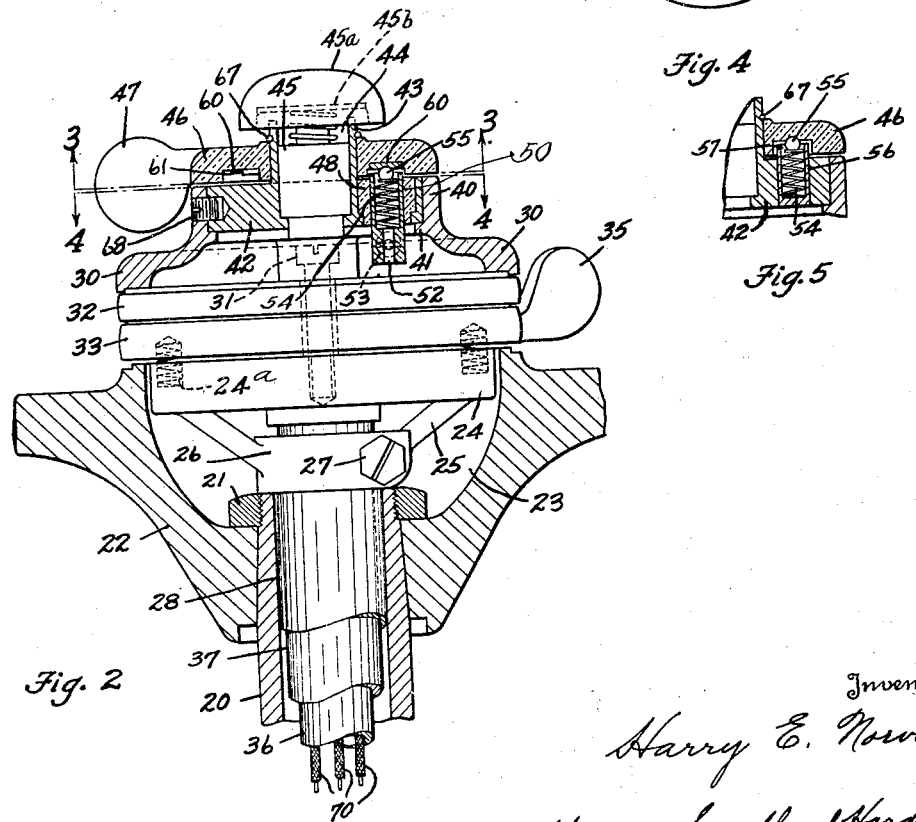
Inventor
Harry E. Norviel
By Spencer Sewall and Hardman
his Attorneys Patented Apr. 8, 1930

1,753,576

UNITED STATES PATENT OFFICE

HARRY E. NORVIEL, OF ANDERSON, INDIANA, ASSIGNOR, BY MESNE ASSIGNMENTS, TO DELCO-REMY CORPORATION, OF DAYTON, OHIO, A CORPORATION OF DELAWARE

SWITCHING APPARATUS FOR STEERING-COLUMN CONTROLS

Application filed April 28, 1925. Serial No. 26,432.

This invention relates to electrical switches, and particularly to switches which are adapted to be mounted upon the steering column of an automotive vehicle to control an electrical circuit of the vehicle.

An object of the invention is to produce at low cost a switch having a neat appearance, and one which will correspond in appearance to the other controls of the automobile which are mounted above the steering column.

Further objects and advantages of the present invention will be apparent from the following description, reference being had to the accompanying drawings, wherein a preferred form of the present invention is clearly shown.

In the drawings:

Fig. 1 is a plan view of an automobile control device including a switch embodying the present invention;

Fig. 2 is a side view thereof, partly in section;

Fig. 3 is a bottom plan view of the movable switch member, taken on the line 3—3 of Fig. 2;

Fig. 4 is a top plan view of the stationary switch member taken on the line 4—4 of Fig. 2; and Fig. 5 is a sectional view on the lines 5—5 of Fig. 4 and 5—5 of Fig. 3.

Referring to the drawings, numeral 20 in Fig. 2 designates the upper end of the steering column which receives a nut 21 for securing to the steering column the hub 22 of a steering wheel. The hub 22 is provided with a recess 23 for receiving a bracket 24 connected by arms 25 with a collar 26, which is clamped by means of a screw 27 to a stationary tube 28. The bracket 24 supports a cover 30 which is maintained in spaced relation to the bracket 24 by screws 31. Two rings 32 and 33 provided, respectively with handles 34 and 35 are maintained in frictional engagement with each other and with the cover 30, by a plurality of springs 24ª located between the bracket 24 and the ring 33. Rings 32 and 33 are connected, respectively, with tubes 36 and 37 which extend through the steering column and stationary tube 28 and are connected at their lower ends with mechanism connecting them, respectively, with the ignition timer control lever and with the engine throttle valve.

This form of engine control apparatus has been used heretofore in automotive vehicles. One of the aims of the present invention is to utilize the cover plate for supporting the switch embodying the present invention. The cover 30 is, therefore, formed to provide an upwardly-extending annular flange 40 and an inwardly-extending annular ledge 41 which define a recess for receiving a metallic switch base 42 in the form of a disc, having a tubular extension 43. The base and extension provide a recess 44 for receiving a push-button switch 45 of the conventional type used for controlling the horn circuit. The button 45ª carries a movable contact 45ᵇ which engages the tubular extension 43 providing a contact grounded through the steering column upon the vehicle frame, as well-known to those skilled in the art. Extension 43 provides a bearing for a rotatable switch contact disc 46 which is made of non-conducting material and is provided with a handle 47. The disc 42 is provided with two non-conducting bushings 48 and 49, receiving tubular members 50 and 51, respectively. Each of these tubular members includes a portion extending below the bushing 48 and 49 and is provided with an opening 52 for receiving the end of a wire which is clamped by a screw 53, threadedly engaging the side wall of the tube and adapted to extend into the hole 52. Each tubular member is provided with a recess for receiving a spring 54 which presses a ball 55 upwardly against the under surface of the disc 46. Tubular members 50 and 51 are spaced 120° apart and a third tubular member 56 is spaced equidistant from the members 50 and 51. This member provides only a socket 57 for a spring 54 which presses a ball 55 against the under surface of the disc 46. The function of the last-mentioned ball 55 is to overcome the tendency of the other balls projecting from the members 50 and 51 to tilt the disc 46 edgewise.

The ball 55 which projects from the tube 50 cooperates with recesses 58 and 59 in a metallic insert 60 which is supported by the disc 46 and presents a contact surface which is accessible through the arcuate groove 61 provided by the disc 46. The ball projecting above the tubular sleeve 51 cooperates with a recess 62 in the contact plate 60 and with a recess 63 in the disc 46. The ball projecting above the tubular member 56 cooperates with recesses 64 and 65 in the disc 46, said recesses being accessible through an arcuate groove 66.

In one position of the switch handle 47, designated "Bright" in Fig. 1, the three balls 55 will be received by the recesses 58, 62 and 64. In this position the tubular members 50 and 51 will be connected by the metallic insert 60 thus short circuiting the ordinary dimmer resistance, not shown. In the "dim" position of the handle 47, the balls 55 will be received by the recesses 59, 63 and 65, thereby disconnecting the tubular members 50 and 51, and thereby breaking the short circuit of a dimmer resistance and consequently causing the lights to be dimmed. As the wiring of the dimmer resistance circuit is familiar to those skilled in the art, illustration thereof is deemed unnecessary. The ends of the grooves 61 and 66 cooperate with the balls 55 to provide stops limiting movement of the lever 47.

The wires indicated by numeral 70 in Fig. 2, which are connected with the members 50 and 51, and the wire connected with the horn button 45, are lead down through the tube 36.

The disc 46 is retained in position by a resilient, split ring 67 received by a groove in the tube 43. By removing the screw 68 which holds the switch base or disc 42 in position, the switches may be removed in assembled relation from the steering column control cover 30. There is sufficient slack in the wire 70 to permit removal of the switch unit so that the wires may be removed from their respective switch terminals.

One advantage of the present invention is that the switch unit may be removed from the steering column without disassembling any other part of the control apparatus. This is a convenience in making repairs to the switch and tightening up the connections between the switch and any of the wires leading from the switch through the steering column.

While the form of embodiment of the invention as herein disclosed, constitutes a preferred form, it is to be understood that other forms might be adopted, all coming within the scope of the claims which follow.

What is claimed is as follows:

1. Electric switching apparatus for the steering column controls of an automotive vehicle comprising, in combination with a stationary metallic bracket mounted above the steering wheel hub, a metallic switch base supported by said bracket and providing a tubular recess and having a tubular extension surrounding the recess, a push-button switch received by said recess and having a movable contact cooperating with the end of said extension which provides a switch contact grounded on the frame of the vehicle through the steering column, a switch lever journaled upon said extension, a movable contact carried by said lever, and a stationary contact insulatingly supported by said switch base.

2. An electric switch comprising, in combination, a switch base, a switch lever having a hub covering said base and rotatable adjacent thereto, said hub having an arcuate groove in the end face thereof adjacent the switch base and a contact insert flush with a plane surface defining the groove, and a spring controlled contact carried by the base and extending into said groove to engage the contact insert, a wall of said groove being engaged by the spring controlled contact to provide a stop limiting the movement of the lever in one direction.

3. An electric switch comprising, in combination, a switch base, a plurality of metallic members located in a circular row upon the base and projecting from one side thereof, a switch lever mounted upon the base concentrically to said metallic members, said lever having a hub forming a cover for the switch base and provided with a plurality of arcuate slots for receiving the metallic members, the end walls of the slots cooperating with the metallic members to provide stops limiting the movement of the lever, and a switch contact carried by the lever hub and accessible through one of the slots.

4. An electric switch comprising in combination, a switch housing including a recessed portion, a metallic switch base secured in said recessed portion, non-conducting bushings in said switch base, said bushings including metallic tubular members provided with terminal portions at their one end, a spring controlled contact in each of the tubular members, a cover of non-conducting material rotatably supported on the switch base, said cover having a lever extending therefrom, and having an arcuate slot provided in the inside surface thereof, and a metallic insert contact in said arcuate slot, adapted to be engaged by the spring pressed contact when the cover is rotated into proper position.

5. An electric switch comprising in combination, a switch base, contacts insulatingly supported on said switch base, a central sleeve-like extension on said base, a switch lever having a hub portion rotatably secured to the said sleeve-like extension, said hub portion having an arcuate slot in the end face thereof adjacent the base, a contact insulatingly supported by the hub and located within the slot and adapted to be moved into and out of engagement with the contacts on the switch base when the switch lever is operated, and a contact carrying member slidably supported in the sleeve-like extension of the switch base, the contact of said member being adapted to engage the end of the said sleeve-like extension to close a circuit when said member is operated.

In testimony whereof I hereto affix my signature.

HARRY E. NORVIEL.